US010147174B2

(12) United States Patent
 Chang

(10) Patent No.: US 10,147,174 B2
(45) Date of Patent: Dec. 4, 2018

(54) SUBSTRATE INSPECTION DEVICE AND METHOD THEREOF

(71) Applicant: ACEMACH CO., LTD, New Taipei (TW)

(72) Inventor: Chih-Chiang Chang, New Taipei (TW)

(73) Assignee: Acemach Co., Ltd., New Taipei (TW)

( * ) Notice: Subject to any disclaimer, the term of this patent is extended or adjusted under 35 U.S.C. 154(b) by 51 days.

(21) Appl. No.: 15/342,614

(22) Filed: Nov. 3, 2016

(65) Prior Publication Data

US 2017/0132779 A1   May 11, 2017

(30) Foreign Application Priority Data

Nov. 6, 2015   (TW) .............................. 104136668 A

(51) Int. Cl.
| | |
|---|---|
| *G06T 7/00* | (2017.01) |
| *G06K 9/62* | (2006.01) |
| *H04N 5/225* | (2006.01) |
| *H04N 7/18* | (2006.01) |
| *H04N 5/265* | (2006.01) |
| *G06K 9/20* | (2006.01) |

(52) U.S. Cl.
CPC .......... *G06T 7/0004* (2013.01); *G06K 9/2027* (2013.01); *G06K 9/6202* (2013.01); *H04N 5/2256* (2013.01); *H04N 5/265* (2013.01); *H04N 7/183* (2013.01); *G06K 2209/19* (2013.01); *G06T 2200/32* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 5,754,678 A | * | 5/1998 | Hawthorne | ........... G06T 7/0004 324/760.01 |
| 2009/0168191 A1 | * | 7/2009 | Takehisa | ................... G03F 1/84 359/665 |
| 2012/0243770 A1 | * | 9/2012 | Kaneko | ............ G01N 21/95607 382/141 |
| 2013/0027543 A1 | * | 1/2013 | Boeykens | .......... G01R 31/2635 348/92 |

* cited by examiner

*Primary Examiner* — Frederick D Bailey
(74) *Attorney, Agent, or Firm* — Wang Law Firm, Inc.

(57) ABSTRACT

A substrate inspection device is provided, which includes a main body, a bearing module, an illuminating and camera module and a control module. A mask is held by the bearing module, which has an opening. The illuminating and image capturing module is disposed on the lifting unit. After receiving the first detecting signal, the control module accordingly drives the lifting unit to shift towards the first direction, such that the illuminating and image capturing module moves closer to the substrate. The control module then controls the shifting unit to drive the light-emitting component to project a first spot-light on the substrate through the opening, and controls the shifting unit to move by a step manner so as to carry the bearing module. The control module also controls the illuminating and image capturing module to capture images the first regions of the substrate and to generate the first images.

12 Claims, 13 Drawing Sheets

```
┌─────────────────────────────────────────────────┐
│  Movably clamping the substrate by a plurality of │──── S30
│   clamping units of the bearing module           │
└─────────────────────────────────────────────────┘
                        ↓
┌─────────────────────────────────────────────────┐
│  Receiving the first inspection signal by the control │
│  module and accordingly driving the lifting unit of the │
│  device main body to move in the first direction, such │──── S31
│     that the illuminating and image capturing module │
│              moves closer to the substrate       │
└─────────────────────────────────────────────────┘
                        ↓
┌─────────────────────────────────────────────────┐
│  Controlling the shifting unit by the control module to │
│    drive the light emission element to project the first │
│  spot-light on the substrate through the opening of the │──── S32
│    bearing module and controlling the shifting unit to │
│     move by the step manner in the second or the third │
│         direction to carry bearing module to move │
└─────────────────────────────────────────────────┘
                        ↓
┌─────────────────────────────────────────────────┐
│    Controlling the illuminating and image capturing │
│  module by the control module to capture images of a │──── S33
│      plurality of first regions of the substrate and to │
│            generate a plurality of first images  │
└─────────────────────────────────────────────────┘
                        ↓
┌─────────────────────────────────────────────────┐
│   Receiving the plurality of first images by the control │
│   module and transforming them to the first full range │──── S34
│   inspection image by using the default image stitching │
│                       program                    │
└─────────────────────────────────────────────────┘
                        ↓
┌─────────────────────────────────────────────────┐
│   Generating the first inspection result message by the │
│    control module based on the comparison of the first │──── S35
│   full range inspection image to the preset first standard │
│                        image                     │
└─────────────────────────────────────────────────┘
```

FIG. 10

```
┌─────────────────────────────────────────┐
│ Receiving the third inspection signal by the control │
│ module and accordingly controlling the illuminating │
│ module to move towards the bearing module, such │
│ that the condenser unit of the illuminating module │────S41
│ moves to the position between the shifting unit and │
│ the bearing module and corresponding to the │
│ illuminating and image capturing module │
└─────────────────────────────────────────┘
                    ↓
┌─────────────────────────────────────────┐
│ Controlling the shifting unit to move by the step │
│ manner in the second or the third direction by the │
│ control module so as to carry the bearing module to │
│ sequentially move to the plurality of preset locations │────S42
│ and controls the condenser unit to sequentially project │
│ the focused light, through the opening, on one of the │
│ plurality of apertures of the substrate │
└─────────────────────────────────────────┘
                    ↓
┌─────────────────────────────────────────┐
│ Controlling the illuminating and image capturing │
│ module by the control module to sequentially capture │────S43
│ the images of the plurality of apertures and to │
│ generate the plurality of aperture images │
└─────────────────────────────────────────┘
```

FIG. 12

Movably clamping the substrate by a plurality of clamping units of the bearing module — S30

Controlling the distance measuring module by the control module to project at least one distance measuring light on the substrate based on the measuring signal — S301

Receiving at least one distance measuring light reflected by the substrate and generates the distance signal by the distance measuring module — S302

Receiving the distance signal by the control module and accordingly controlling the lifting unit to move in the first direction, such that the illuminating and image capturing module is spaced apart from the substrate by a predetermined working distance — S303

Controlling the illuminating and image capturing module by the control module to capture an image for each first region of the substrate based on the inspection signal — S304

FIG. 13

SUBSTRATE INSPECTION DEVICE AND METHOD THEREOF

CROSS-REFERENCE TO RELATED APPLICATION

This application claims priority from Taiwan Patent Application No. 104136668, filed on Nov. 6, 2015 in the Taiwan Intellectual Property Office, the content of which is hereby incorporated by reference in its entirety for all purposes.

BACKGROUND OF THE INVENTION

1. Field of the Invention

The present invention relates to a substrate inspection device and a method thereof, and particularly relates to a substrate inspection device capable of utilizing an illuminating and image capturing module to capture images of a plurality of regions of the substrate, and the method thereof.

2. Description of the Related Art

A mask is a very important piece for manufacturing integrated circuits. The designed geometric pattern is first shrunk and translated onto a substrate, such as a quartz substrate, through electron beam. Since the diameter of the electron beam is around 1 μm, the critical dimension of the pattern on the substrate is also around 1 μm. The pattern on the mask is then projected onto a silicon wafer for the mass production.

Before in use, the mask is inspected through an inspection procedure to see if there is any anomaly on it. Currently, the conventional mask inspection device captures a full-area image for anomaly examination; however, the full-area image has insufficient resolution, which causes identifying problem or misreading problem for finding all anomalies.

Therefore, the inventors of the present invention design a substrate inspection device and the method thereof to solve the current technical issues and to improve the industrial practical applicability.

SUMMARY OF THE INVENTION

In view of the issue of the aforementioned conventional techniques, the purpose of the present invention is to provide a substrate inspection device and the method thereof to solve the current technical issues.

For its purpose, the present invention provides a substrate inspection device including a device main body, a bearing module, an illuminating and image capturing module, and a control module. A surface of the device main body is movably disposed with a shifting unit, and a surface of the shifting unit is disposed with a light emission element. A lifting unit is suspended above the surface of the device main body. The bearing module is suspended above a surface of the shifting unit, and a plurality of clamping units are movably disposed on other surface of the bearing unit opposing to the shifting unit and configured to movably clamp a substrate, and the main body of the bearing module has an opening. The illuminating and image capturing module is disposed on the lifting unit. The control module is electrically connected with the shifting unit, the lifting unit, and the illuminating and image capturing module. After receiving the first inspection signal, the control module accordingly drives the lifting unit to move in the first direction so as to move the illuminating and image capturing module closer to the substrate. The control module controls the shifting unit to drive the light emission element to project a first spotlight on the substrate through the opening and controls the shifting unit to move by a step manner in a second or third direction, so as to carry the bearing module to move. The control module also controls the illuminating and image capturing module to capture images of a plurality of first regions of the substrate and to generate a plurality of first images.

Preferably, the control module can receive the plurality of first images and transform them into the first full-range inspection image by using a default image stitching program. Based on the comparison of the first full range inspection image to a preset first standard image, the control module generates a first inspection result message.

Preferably, the control module receives the second inspection signal and accordingly drives the illuminating and image capturing module to project a second spotlight on the substrate and controls the shifting unit to move by the step manner in the second or third direction so as to carry the bearing module to move, and the control module controls the illuminating and image capturing module to capture images of a plurality of regions of the substrate and to generate a plurality of second images.

Preferably, the control module receives the plurality of second images and, transforms the plurality of second images to a second full-range inspection image by using the default image stitching program, and the control module generates a second inspection result message based on the comparison of the second full range inspection image to the preset second standard image.

Preferably, the substrate inspection device further comprises an illuminating module, which is movably disposed on the device main body and is electrically connected to the control module, and the illuminating module includes a condenser unit. The control module receives a third inspection signal and accordingly controls the illuminating module to move towards the bearing module, such that the condenser unit moves to a position between the shifting unit and the bearing module and corresponding to the illuminating and image capturing module, and the control module controls the shifting unit to move by the step manner in the second direction or third direction so as to carry the bearing module to sequentially move to a plurality of preset locations, and controls the condenser unit to sequentially project focused light through the opening on one of a plurality of apertures of the substrate, and the control module controls the illuminating and image capturing module to sequentially capture images of the plurality of apertures and to generate a plurality of aperture images.

Preferably, the substrate inspection device can further comprise a distance measuring module, which is electrically connected to the control module and is disposed on the lifting unit, and the control module controls the distance measuring module to project at least one distance measuring light on the substrate based on the measuring signal, and the distance measuring module receives at least one distance measuring light reflected by the substrate and generates a distance signal.

Preferably, the control module receives the distance signal and accordingly controls the lifting unit to move in the first direction, such that the illuminating and image capturing module is spaced apart from the substrate by a predetermined working distance, and the control module controls the illuminating and image capturing module to capture an image for each of the first regions of the substrate based on the first inspection signal.

Based on its purpose, the present invention also provides a substrate inspection method comprising the steps of:

movably clamping the substrate, by a plurality of clamping units of the bearing module;

upon receipt of the first inspection signal, driving the lifting unit of the device main body, by the control module, to move in the first direction, so as to move the illuminating and image capturing module closer to the substrate;

controlling a shifting unit, by the control module, to drive a light emission element to project a first spotlight through an opening of the bearing module on the substrate and controlling the shifting unit to move by a step manner in the second direction or third direction, so as to carry the bearing module to move; and controlling the illuminating and image capturing module, by the control unit, to capture images of a plurality of first regions of the substrate and to generate a plurality of sub-images.

Preferably, the substrate inspection method can further comprise the steps as follows:

receiving the plurality of first images by the control module and transforming the plurality of first images to the first full range inspection image by using the default image stitching program; and generating the first inspection result message based on the comparison of the first full range inspection image to the preset first standard image by the control module.

Preferably, the substrate inspection method can further comprise the steps as follows:

receiving the second inspection signal by the control module and accordingly driving the illuminating and image capturing module to project the second spot-light on the substrate;

controlling the shifting unit to move by the step manner in the second direction or in the third direction by the control module so as to carry the bearing module to move; and controlling the illuminating and image capturing module by the control module to capture images of a plurality of second regions of the substrate and to generate a plurality of second images.

Preferably, the substrate inspection method can further comprise the steps as follows:

receiving the plurality of second images by the control module and transforming the plurality of second images to the second full range inspection image by using the default image stitching program; and generating the second inspection result message by the control module based on the comparison of the second full range inspection image to the preset second standard image.

Preferably, the substrate inspection method can further comprise the steps as follows:

receiving the third inspection signal by the control module and accordingly controlling the illuminating module to move towards the bearing module, such that the condenser unit of the illuminating module moves to the position between the shifting unit and the bearing module and corresponding to the illuminating and image capturing module; and controlling the shifting unit by the control module to move by the step manner in the second direction or in the third direction so as to carry the bearing module to sequentially move to a plurality of preset locations and controlling the condenser unit by the control module to sequentially project a focused light through the opening on each of a plurality of apertures of the substrate; and controlling the illuminating and image capturing module by the control module to sequentially capture images of the plurality of apertures and to generate a plurality of aperture images.

Preferably, before the step of the control module receiving the inspection signal, the method further comprises the steps of:

controlling the distance measuring module by the control module to project at least one distance measuring light on the substrate based on the measuring signal; and receiving at least one distance measuring light reflected by the substrate and generates a distance signal by the distance measuring module.

Preferably, the step of generating the distance signal further comprises the steps of:

receiving the distance signal by the control module and accordingly controlling the lifting unit to move in the first direction, such that the illuminating and image capturing module is spaced apart from the substrate by the predetermined working distance; and controlling the illuminating and image capturing module the control module to capture an image for each first region of the substrate based on the inspection signal.

As aforementioned, the substrate inspection device and the method thereof have one or more following advantages:

1. The substrate inspection device and the method thereof of the present invention have the advantage of improving the accuracy of anomaly detection on a substrate. It is achieved through the device main body driving the bearing module to move by the step manner and controlling the illuminating and image capturing module to capture images of the plurality of regions of the substrate so as to acquire high quality and clear first images for an operator to determine if there is anomaly on the substrate.

2. The substrate inspection device and the method thereof of the present invention have the advantage of facilitating the convenience of the use of the fixed-focus illuminating and image capturing module. It is achieved through the distance measuring module projecting a distance measuring light on the substrate and receiving the reflected distance measuring light to generate the distance signal so as to acquire the thickness of the substrate, such that the working height of the illuminating and image capturing module can be accordingly adjusted.

BRIEF DESCRIPTION OF THE DRAWINGS

FIG. 10 is the first flow chart representing the substrate inspection method of the present invention.

FIG. 12 is the third flow chart representing the substrate inspection method of the present invention.

FIG. 13 is the fourth flow chart representing the substrate inspection method of the present invention.

DESCRIPTION OF THE PREFERRED EMBODIMENTS

Figure 1:
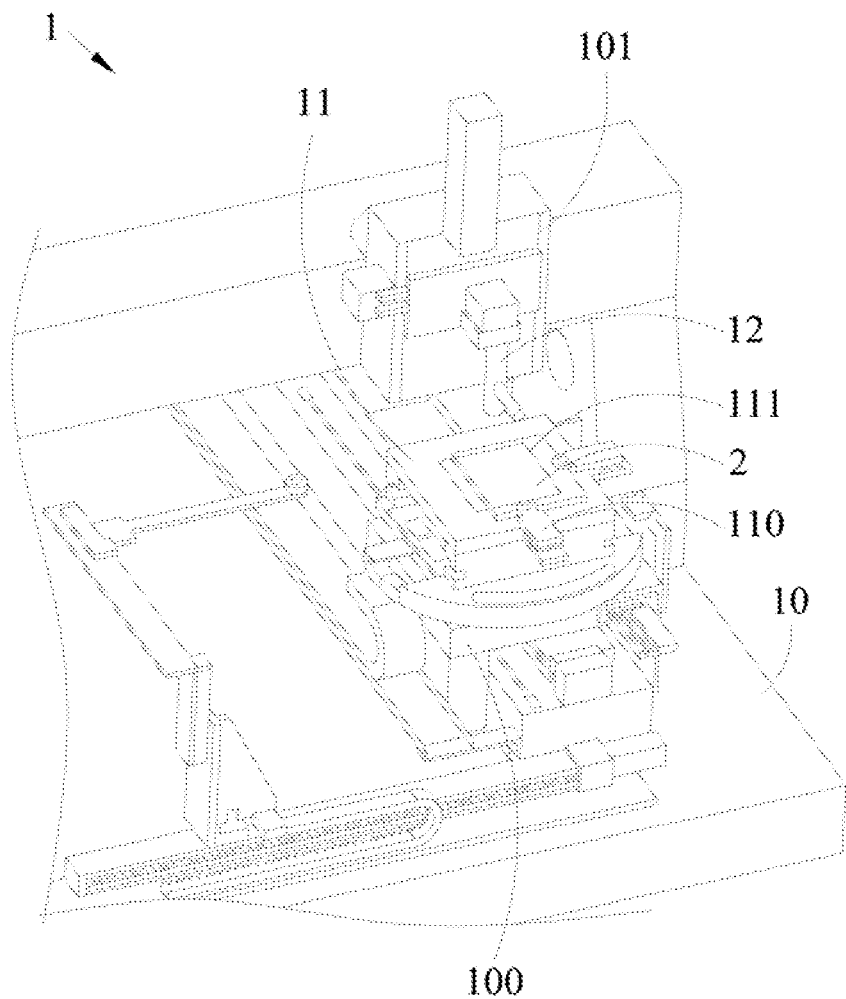
FIG. 1 is the first schematic diagram showing the first embodiment of the substrate inspection device of the present invention.

For better understanding the features, the content, the advantages, and the effects, the present invention will be presented hereinafter through preferable embodiments accompanying with corresponding figures. Since being only for the illustrative and auxiliary purposes, the figures are not necessarily implying the actual ratio or precise configuration of the products of the present invention. Therefore, the claims of the present invention that actually being applied should not be limited by said figures' ratio and configurations.

The embodiments of the substrate inspection device and the method thereof of the present invention will be described referring to the corresponding figures. For better understanding, the same elements will be designated by the same reference numerals through all embodiments.

Figure 2:
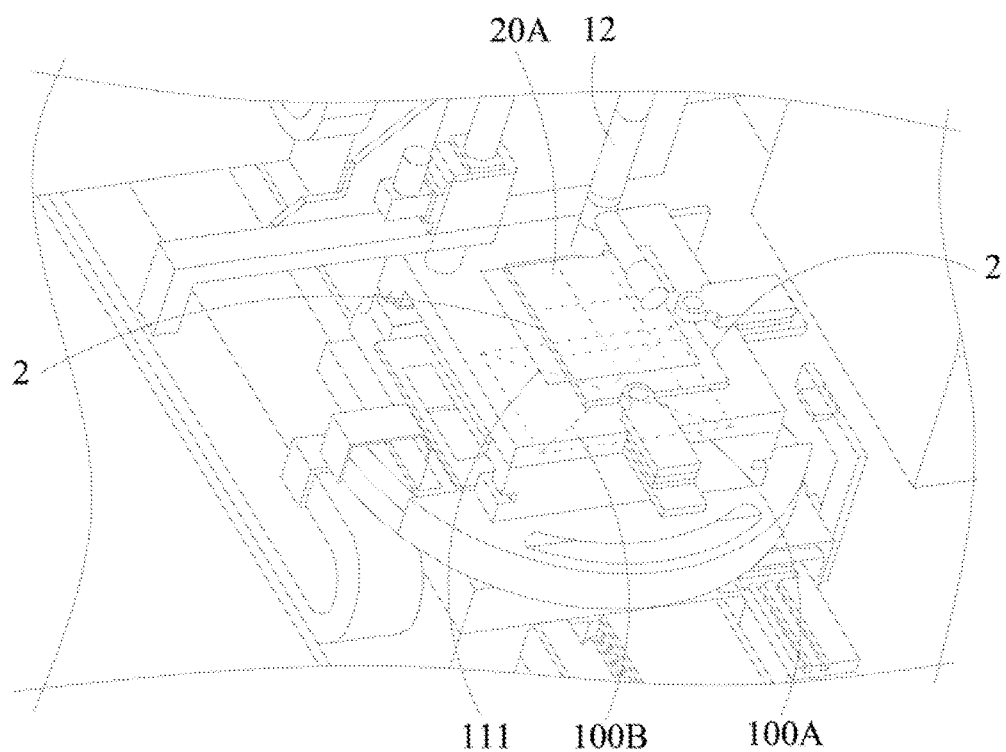
FIG. 2 is the second schematic diagram showing the first embodiment of the substrate inspection device of the present invention.
Figure 3:
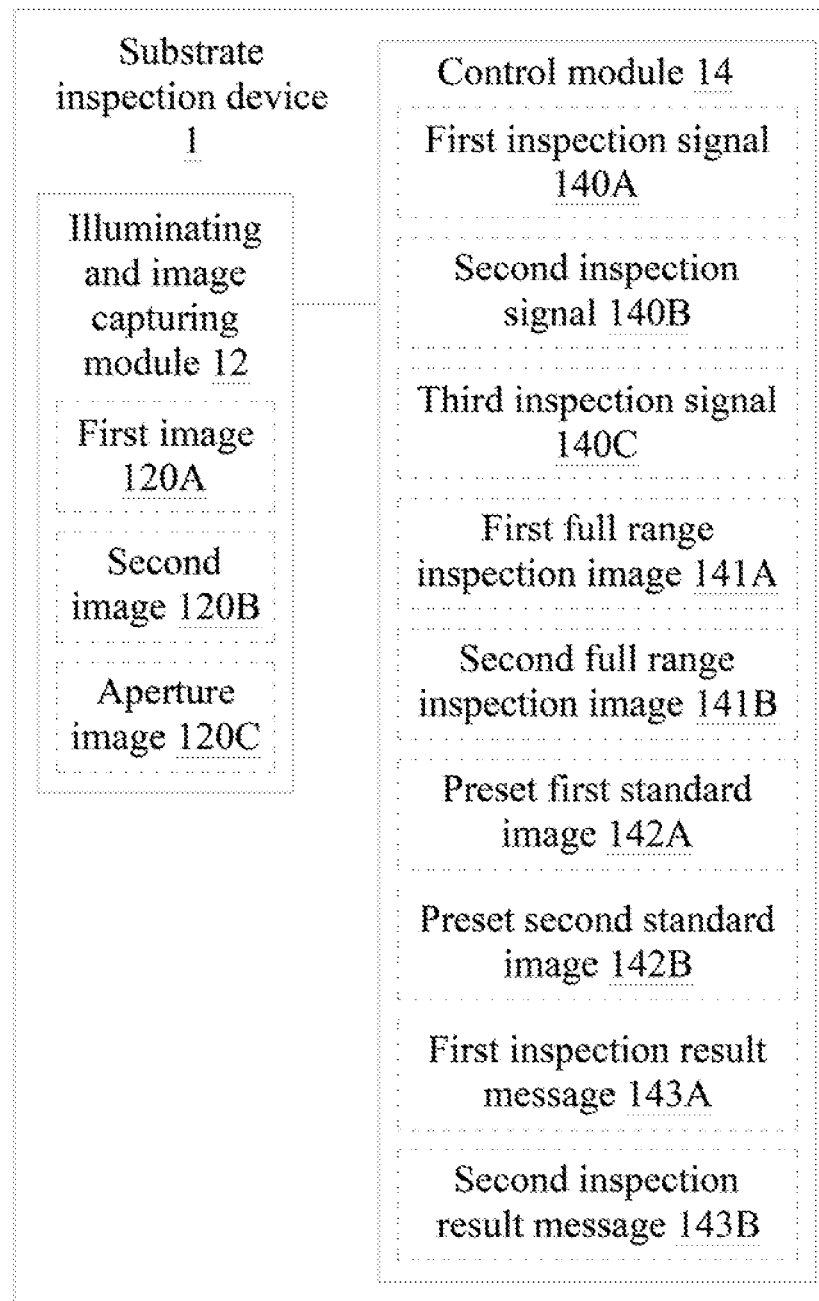
FIG. 3 is the block diagram showing the first embodiment of the substrate inspection device of the present invention.

Refer to FIGS. 1-3, which are respectively the first schematic diagram, the second schematic diagram and the block diagram showing the first embodiment of the substrate inspection device of the present invention. As shown in the figures, the substrate inspection device 1 includes a device main body 10, a bearing module 11, an illuminating and image capturing module 12, and a control module 14. A surface of the device main body 10 is movably disposed with a shifting unit 100, a surface of which is disposed with a light emission element 100A. A lifting unit 101 is also suspended above the same surface of the device main body 10. The bearing module 11 is suspended above a surface of the shifting unit 100, and a plurality of clamping units 110 are movably disposed on the surface on the opposite side from the surface opposing to the shifting unit 100. The plurality of clamping units 110 can movably clamp a substrate 2. The main body of the bearing module 11 has an opening 111. The illuminating and image capturing module 12 is disposed on the lifting unit 101. The control module 14 is electrically connected with the shifting unit 100, the lifting unit 101, and the illuminating and image capturing module 12. After receiving the first inspection signal 140A, the control module 14 accordingly drives the lifting unit 101 to move in the first direction so as to move the illuminating and image capturing module 12 closer to the substrate 2. The control module 14 controls the shifting unit 100 to drive the light emission element 100A to project the first spot-light 100B on the substrate 2 through an opening 111 and controls the shifting unit 100 to move by the step manner in the second or the third direction so as to carry the bearing module 11 to move. The control module 14 also controls the illuminating and image capturing module 12 to take images of a plurality of first regions 20A of the substrate 2 and to generate a plurality of first images 120A.

Specifically, the substrate inspection device 1 of the present invention provides the first images 120A with high quality and clarity for an operator to identify anomalies. It is achieved through driving the bearing module 11 by the device main body 10 to move in a step manner and controlling the illuminating and image capturing module 12 to capture images of the plurality of first regions 20A of the substrate 2. The substrate inspection device 1 comprises the device main body 10, the bearing module 11, the illuminating and image capturing module 12, and the control module 14. The surface of the device main body 10 is movably disposed with the shifting unit 100, which can move forward and backward or to the left and to the right on the surface of the device main body 10 through a guide track. The light emission element 100A, which can be a backlight module, is disposed on the shifting unit 100. Installing on the same surface of the device main body 10, a gantry can hold the lifting unit 101, such that the lifting unit 101 is suspended on the surface of the device main body 10. Likewise, the lifting unit 101 can also move upward or downward through a guide track on the gantry. The illuminating and image capturing module 12 is disposed on the lifting unit 101. The bearing module 11 is suspended on a surface of the shifting unit 100, and a plurality of clamping units 110 are movably disposed on a surface of the bearing module 11. A substrate 2, such as a quartz plate, can be gripped by the clamps manually controlled by an operator or electronically controlled by the control module 14. The bearing module 11 has an opening 111. The control module 14, which can be a processor, is electrically connected with the shifting unit 100, the lifting unit 101, and the illuminating and image capturing module 12.

While an operator utilizes the substrate inspection device 1 to inspect the substrate 2, the control module 14 can receive the first inspection signal 140A and accordingly drive the lifting unit 101 to move in the first direction, such as up/down or z-axis direction, so as to move the illuminating and image capturing module 12 closer to the upper surface of the substrate 2. The control module 14 then controls the shifting unit 100 to move by the step manner in the second direction, such as forward/backward or y-axis direction, or in the third direction, such as left/right or x-axis direction, so as to carry the bearing module 11 to move. So, the illuminating and image capturing module 12 can take an image of each first region 20A on the surface of the substrate 2. The control module 14 also controls the shifting unit 100 to drive the light emission element 100A to project the first spot-light 100B on the substrate 2 through the opening 111, such that there is sufficient luminosity for the illuminating and image capturing module 12 to capture an image. Then, while the shifting unit 100 moves by the step manner to drive the bearing module 11 to move one step at a time, the control module 14 also controls the illuminating and image capturing module 12 to take an images of each first region 20A on the lower surface of the substrate 2 and to generate a plurality of first images 120A. Preferably, the illuminating and image capturing module 12 is capable of auto focusing, so as to take a clear image of each different first region 20A.

As a result, the clear image of each first region 20A on the lower surface of the substrate 2 can be acquired by an operator to accurately determine whether if there is any anomaly on the substrate. In this way, the accuracy of the substrate inspection can be improved.

Furthermore, the control module 14 can receive the plurality of first images 120A and transform them together into the first full range inspection image 141A though a default image stitching program. Based on the comparison between the first full range inspection image 141A to the preset first standard image 142A, the control module 14 generates the first inspection result message 143A. For example, besides providing the plurality of first images 120A to an operator to read through one by one, the control module 14 can also combine the plurality of first images 120A together to form the first full range inspection image 141A through the default image stitching program (the image stitching method and application are commonly known, such that the description is skipped) and generate first inspection result message 143A by comparing the first full range inspection image 141A to the preset first standard image 142A. The preset first standard image 142A is the standard image information of the uncontaminated substrate 2 stored beforehand in a memory of the control module 14 by, for example, operator.

Through the first inspection result message 143A that is generated from one-time comparison, the anomaly on the upper surface of the substrate can be identified with efficiency. A black figure is shown in the first image 120A or in the first full range inspection image 141A, if there is an anomaly on the lower surface of the substrate 2.

Figure 4:
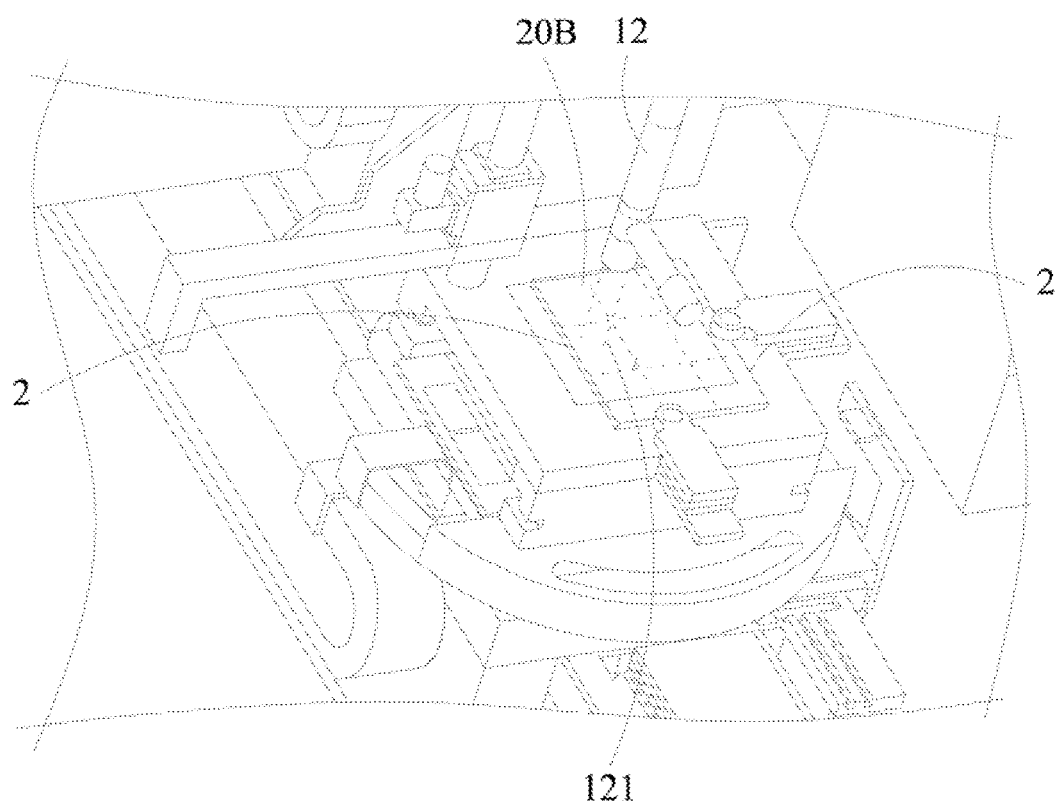
FIG. 4 is the schematic diagram showing the second embodiment of the substrate inspection device of the present invention.

Refer to FIG. 4, which is the schematic diagram showing the second embodiment of the substrate inspection device of the present invention. Also refer to FIGS. 1-3. As shown in the figures, the same elements in this embodiment of the substrate inspection device act similarly as those in the first embodiment, and the repetition is therefore omitted. It should be noted that, in this embodiment, the control module 14 receives the second inspection signal 140B and accordingly drives the illuminating and image capturing module 12 to project a second spot-light 121 on the substrate 2 and controls the shifting unit 100 to move by the step manner in the second or the third direction so as to carry the bearing module 11 to move. The control module 14 also controls the illuminating and image capturing module 12 to capture images of a plurality of second regions 20B and to generate a plurality of second images 120B.

Specifically, while an operator utilizes the substrate inspection device 1 to inspect the substrate 2, the control module 14 can receive the second inspection signal 140B and accordingly drive the illuminating and image capturing module 12 to project the second spot-light 121 on the substrate 2, such that there is sufficient luminosity for the illuminating and image capturing module 12 to capture an image. The illuminating and image capturing module 12, is a combination of a camera component and an illuminating component, wherein theory of beam splitter and the telecentric effect are applied for the purposes of illuminating and image capturing. The control module 14 then controls the shifting unit 100 to move by the step manner in the second direction, such as forward/backward or y-axis direction, or in the third direction, such as left/right or x-axis direction, so as to carry the bearing module 11 to move, such that the illuminating and image capturing module 12 can take an image of each second region 20B on the upper surface of the substrate 2. Then, while the shifting unit 100 moves by the step manner to drive the bearing module 11 to move one step at a time, the control module 14 also controls the illuminating and image capturing module 12 to take an images of the second regions 20B on the upper surface of the substrate 2 so as to generate a plurality of second images 120B. Preferably being capable of auto focusing, the illuminating and image capturing module 12 can therefore take a clear image of each different second region 20B.

As a result, the clear image of each second region 20B of the upper surface of the substrate 2 can be acquired by an operator to accurately determine whether if there is any anomaly on the substrate. In this way, the accuracy of the substrate inspection can be improved.

Furthermore, the control module 14 can receive the plurality of second images 120B and compose them together into the second full range inspection image 141B though the default image stitching program. By comparing the second full range inspection image 141B to a preset second standard image 142B, the control module 14 generates the second inspection result message 143B.

Figure 5:
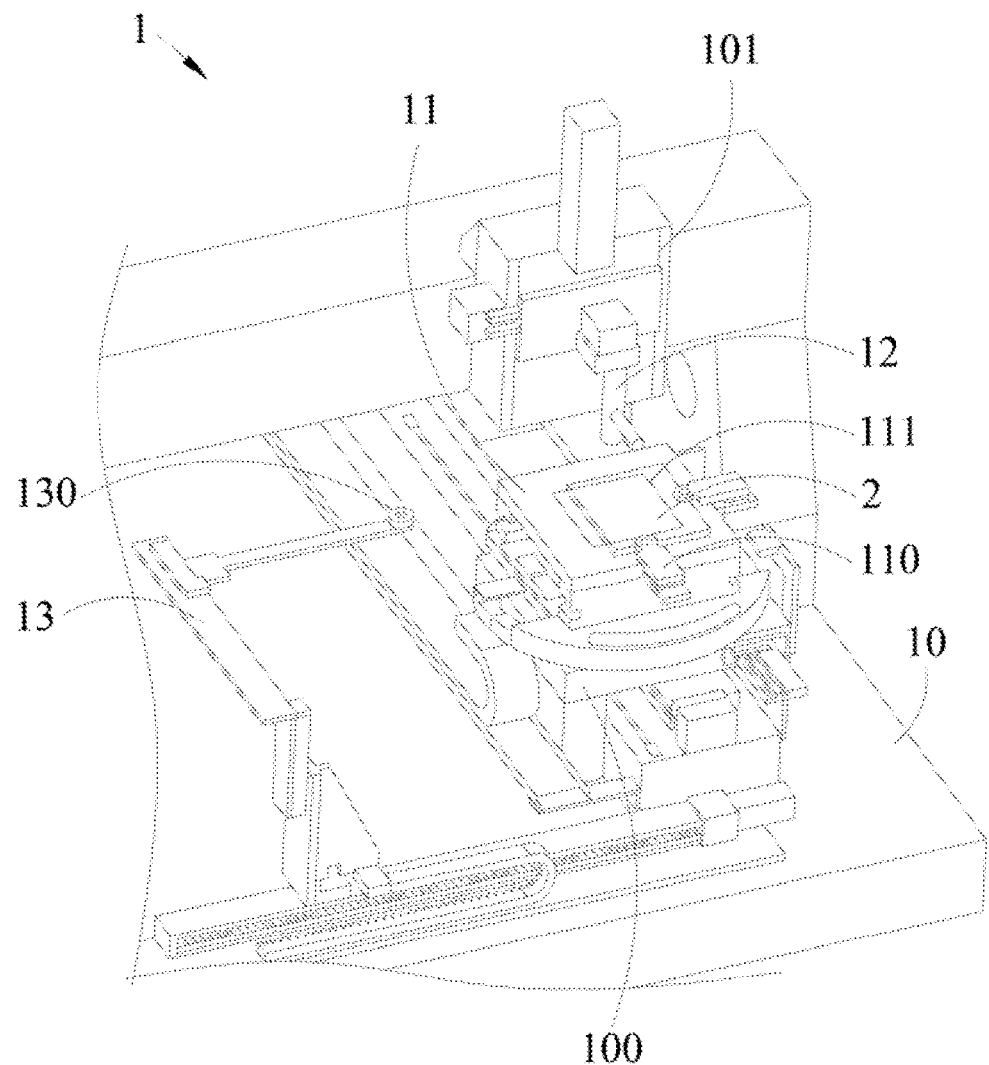
FIG. 5 is the first schematic diagram showing the third embodiment of the substrate inspection device of the present invention.
Figure 6:
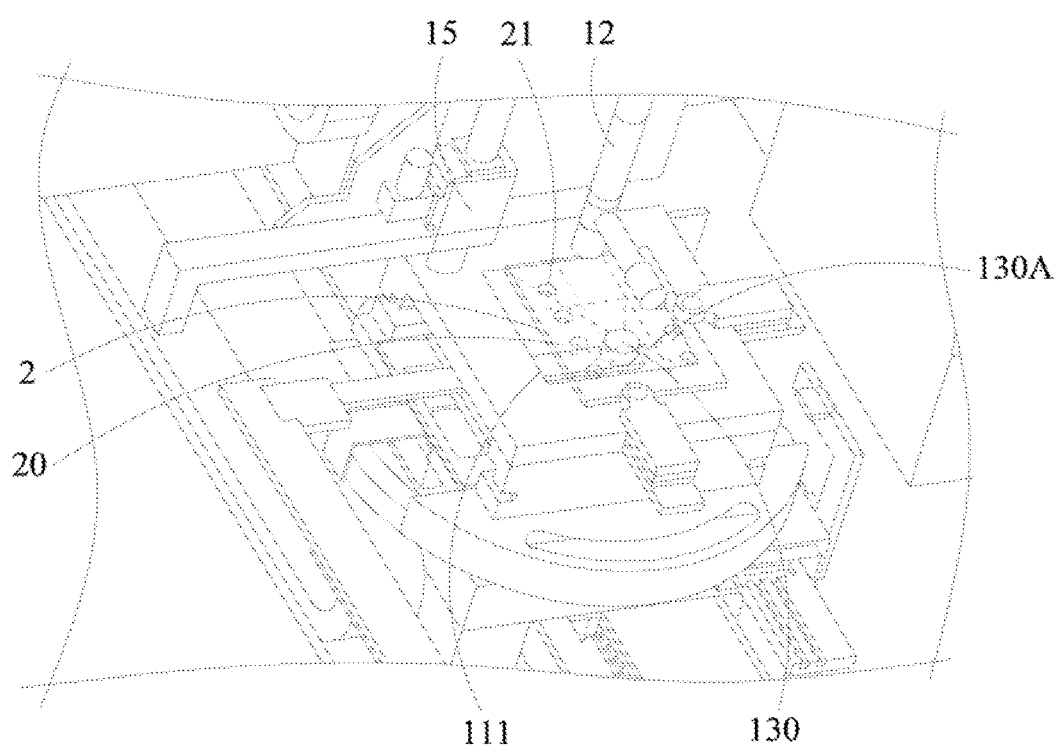
FIG. 6 is the second schematic diagram showing the third embodiment of the substrate inspection device of the present invention.

Refer to FIGS. 5 and 6, which are the first and the second schematic diagrams showing the third embodiment of the substrate inspection device of the present invention. Also refer to FIGS. 1-4. As shown in the figures, the same elements in this embodiment of the substrate inspection device act similarly as those in the first embodiment, and the repetition is therefore omitted. It should be noted that, in this embodiment, the substrate inspection device 1 can preferably further comprise an illuminating module 13, which is movably disposed on the device main body 10 and electrically connected to the control module 14. The illuminating module 13 comprise a condenser unit 130. The control module 14 receives the third inspection signal 140C and accordingly controls the illuminating module 13 to move towards the bearing module 11, such that the condenser unit 130 moves to the position between the shifting unit 100 and the bearing module 11 and correspondingly facing the illuminating and image capturing module 12. The control module 14 also controls the shifting unit 100 to move by the step manner in the second or the third direction to carry the bearing module 11 to sequentially move to a plurality of preset locations and controls the condenser unit 130 to project a focused light 130A through the opening 111 on one of a plurality of apertures 21 of the substrate 2. The control module 14 also controls the illuminating and image capturing module 12 to sequentially capture the images of the plurality of apertures 21 and to generate a plurality of aperture images 120C.

For example, while an operator utilizes the substrate inspection device 1 to inspect the substrate 2, the control module 14 can receive the third inspection signal 140C and accordingly control the illuminating module 13 to move, to the left or to the right, towards the bearing module 11, such that the condenser unit 130 can move to a position between the shifting unit 100 and the bearing module 11, which is below the substrate 2. In this position, the condenser unit 130 correspondingly faces the illuminating and image capturing module 12. The control module 14 then controls the shifting unit 100 to move by the step manner in the second direction, such as forward/backward or y-axis direction, or in the third direction, such as left/right or x-axis direction, so as to carry the bearing module 11 to move. Therefore, the illuminating and image capturing module 12 can take an image of each region 20 on the surface of the substrate 2. The control module 14 also controls the condenser unit 130 to project a focused light 130A on the substrate 2 through the opening 111, such that there is sufficient luminosity for the illuminating and image capturing module 12 to capture an image. While the shifting unit 100 moves by the step manner to drive the bearing module 11 to move one step at a time to a plurality of preset locations, each of which corresponds to the location of each opening 21 of the substrate 2, the control module 14 also controls the illuminating and image capturing module 12 to sequentially take an images of each opening 21 on the surface of the substrate 2 and to generate a plurality of aperture images 120C.

In this way, the aperture image 120C of each opening 21 of the substrate 2 can be acquired for the control module 14 or manually for a user to determine if the opening 21 in the aperture image 120C is clear. This can provide a user to accurately determine the image taking accuracy of the illuminating and image capturing module 12.

Figure 7:
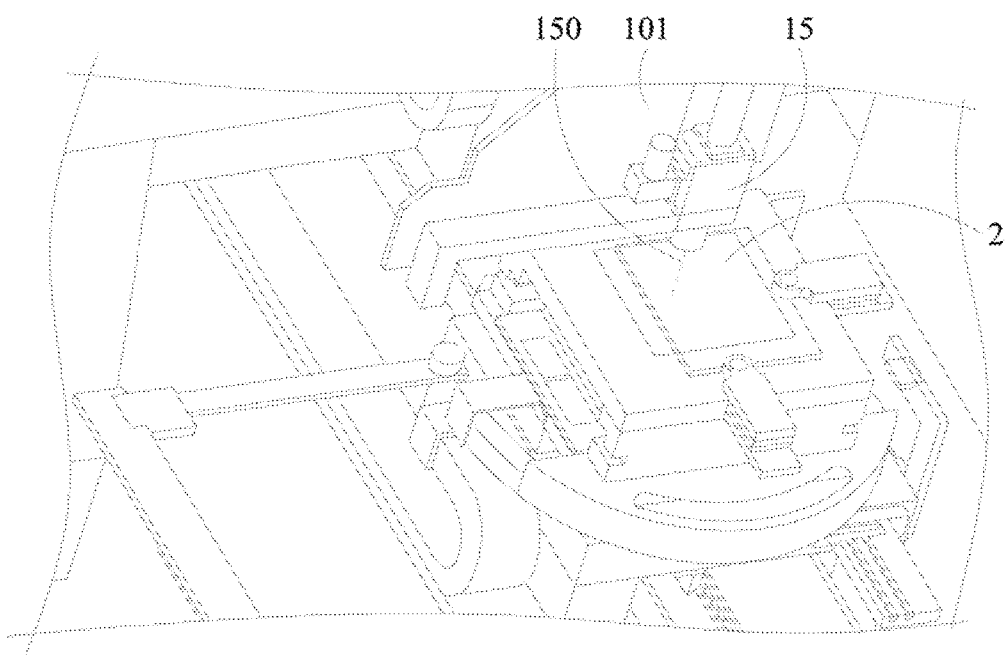
FIG. 7 is the schematic diagram showing the fourth embodiment of the substrate inspection device of the present invention.
Figure 8:
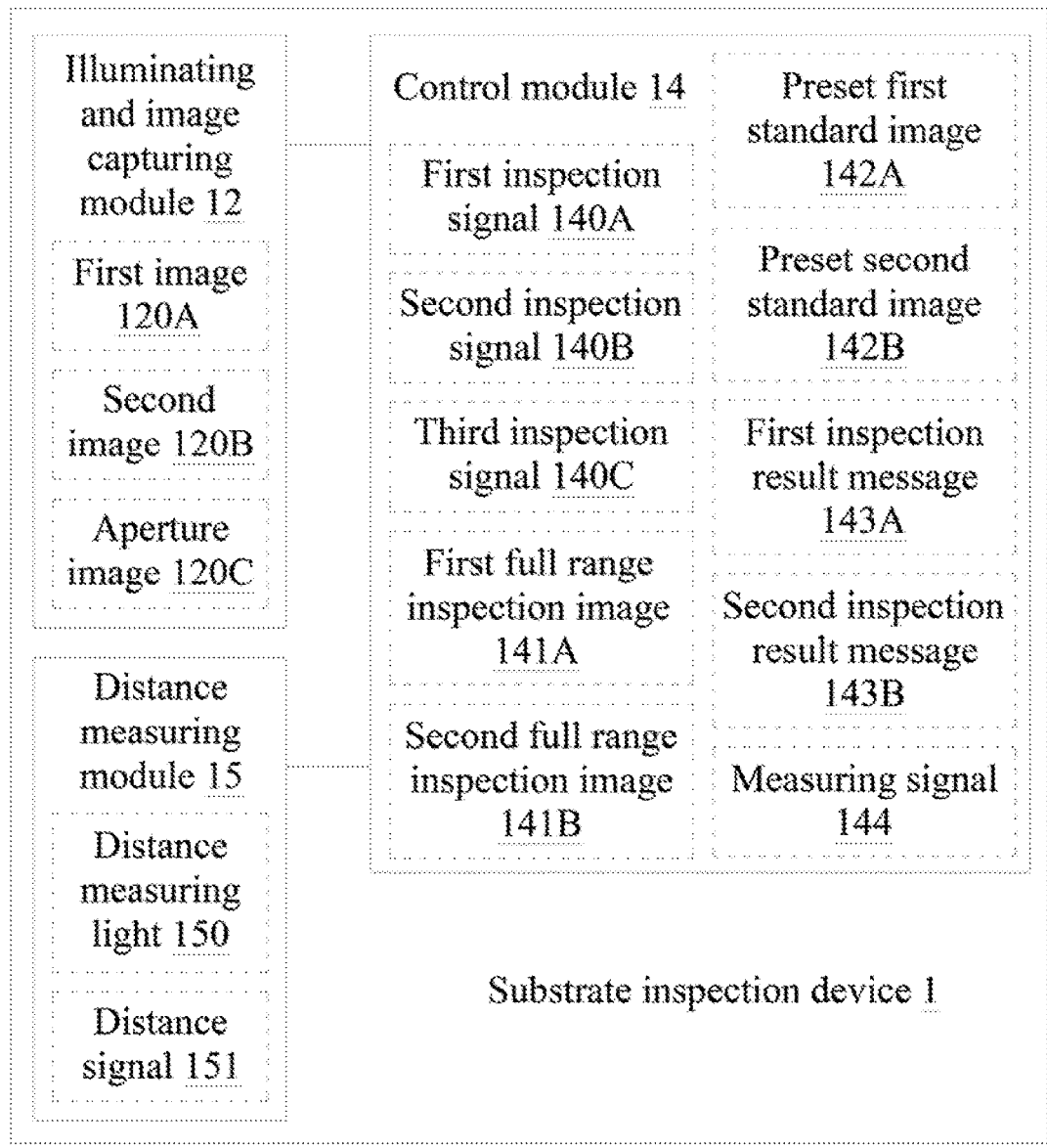
FIG. 8 is the block diagram showing the fourth embodiment of the substrate inspection device of the present invention.

Refer to FIGS. 7 and 8, which are respectively the schematic diagram and the block diagram showing the fourth embodiment of the substrate inspection device of the present invention. Also refer to FIGS. 1-6. As show in the figures, the same elements in this embodiment of the substrate inspection device act similarly as those in the previous embodiments, and the repetition is therefore omitted. However, it should be noted that, in this embodiment, the substrate inspection device 1 can preferably comprise a distance measuring module 15, which is electrically connected to the control module 14 and disposed on the lifting unit 101. The control module 14 controls the distance measuring module 15 to project at least one distance measuring light 150 on the substrate 2 based on a measuring signal 144, and the distance measuring module 15 receives at least one distance measuring light reflected by the substrate 2 and generates a distance signal 151.

Furthermore, the control module 14 can receive the distance signal 151 and accordingly control the lifting unit 101 to move in the first direction, such that the illuminating and image capturing module 12 is spaced apart from the substrate 2 by a predetermined working distance. The control module 14 also controls the illuminating and image capturing module 12 to capture the image of each first region 20A of the substrate 2 based on the first inspection signal 140A.

Specifically, the substrate inspection device 1 of the present invention further comprises the distance measuring module 15, which can be a laser rangefinder and is electrically connected to the control module 14 and disposed on the lifting unit 101 nearby the illuminating and image capturing module 12. Before utilizing the substrate inspection device 1 to perform an inspection, the control module 14 controls the distance measuring module 15 to project at least one distance measuring light 150 on the substrate 2 based on the measuring signal 144 and to receive at least one distance measuring light 150 reflected from the substrate 2 and to generate a distance signal 151. Therefore, the thickness of the substrate 2 can be further acquired for adjusting the working height of the illuminating and image capturing module 12 to take an image.

The control module 14 then controls the lifting unit 101 to move in the first direction based on the distance signal 151 so as to adjust the distance between the illuminating and image capturing module 12 and the substrate 2 to a predetermined working distance, which is, but not limited to, 3 cm to 5 cm. The control module 14 then controls to actuate every module based on the inspection signal 140 and drives the illuminating and image capturing module 12 to take an image of each first region 20A of the substrate 2 and to generate a plurality of first images 120A. In this embodiment, the illuminating and image capturing module 12 can be a fixed-focus imaging device.

Therefore, the substrate inspection device 1 of the present invention provides the way to save the inspection time by avoiding the focusing step of each image taken by the illuminating and image capturing module 12. This is achieved through measuring the thickness of the substrate 2 and acquiring the working height by the distance measuring module 15.

Figure 9:
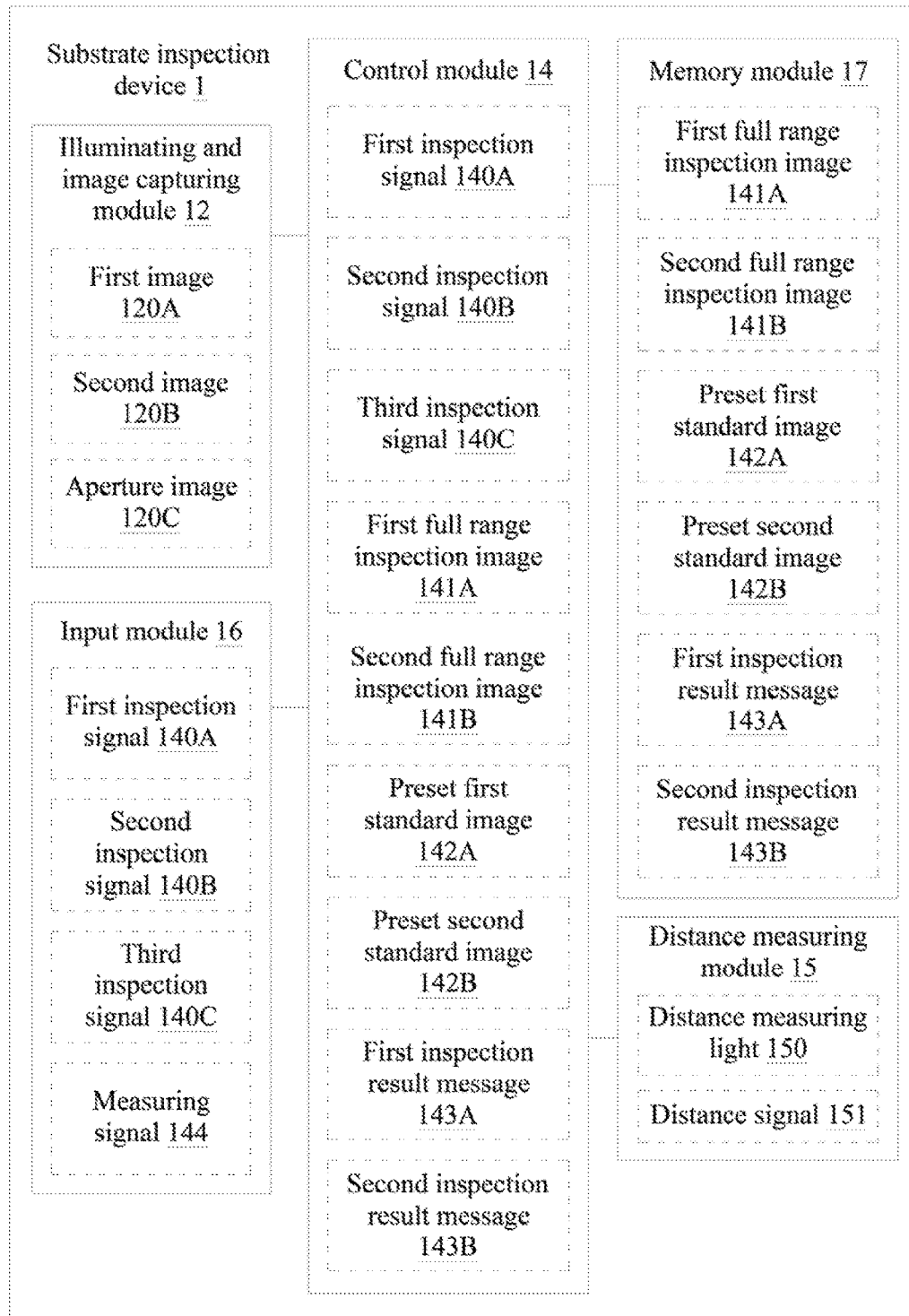
FIG. 9 is the block diagram showing the fifth embodiment of the substrate inspection device of the present invention.

Refer to FIG. 9, which is the block diagram showing the fifth embodiment of the substrate inspection device of the present invention. Also refer to FIGS. 1-8. As show in the figures, the same elements in this embodiment of the substrate inspection device act similarly as those in the previous embodiments, and the repetition is therefore omitted. However, it should be noted that, in this embodiment, the substrate inspection device 1 can preferably comprise an input module 16, which is electrically connected to the control module 14. The input module 16 receives at least one touch to selectively generate the first inspection signal 140A, the second inspection signal 140B, the third inspection signal 140C, or the measuring signal 144 and to transmit the first inspection signal 140A, the second inspection signal 140B, the third inspection signal 140C, or the measuring signal 144 to the control module 14.

For example, the substrate inspection device 1 further comprises the input module 16, which can be a keyboard with physical buttons or keys or a pad device with virtual keys and can be electrically connected to the control module 14. While it is needed to perform the inspection on the substrate 2, an operator can touch the input module 16 to generate the first inspection signal 140A, the second inspection signal 140B, or the third inspection signal 140C, such that the control module 14 controls each module to function, and therefore the substrate inspection device 1 takes an image for each first region 20A or for each second region 20B and generates a plurality of first images 120A or second images 120B.

If the operator would like the substrate inspection device 1 to perform the distance measurement on the substrate 2, the operator can touch the input module 16 to generate the measuring signal 144, such that the control module 14 controls the distance measuring module 15 to project at least one distance measuring light 150 on the substrate 2, and therefore to generate the distance signal 151, which can be utilized to adjust the predetermined working distance between the illuminating and image capturing module 12 and the substrate 2.

Furthermore, the substrate inspection device 1 of the present invention can preferably further comprise a memory module 17, which is electrically connected to the control module 14 and can store the default image stitching program, the first full range inspection image 141A, the second full range inspection image 141B, the preset first standard image 142A, the preset second standard image 142B, the first inspection result message 143A, and the second inspection result message 143B. Specifically, the substrate inspection device 1 of the present invention can further comprise the memory module 17, which can be a storage device such as a memory or a hard disk and is electrically connected to the control module 14. The memory module 17 can store the default image stitching program, the preset first standard image 142A, and the preset second standard image 142B in advance. The memory module 17 can also receive and store the first full range inspection image 141A, the second full range inspection image 141B, the first inspection result message 143A, and the second inspection result message 143B sent from the control module 14.

In the previous description of the substrate inspection device of the present invention, although the substrate inspection method of the present invention has already been mentioned, the flow chart of the method will be illustrated hereinafter for the purpose of clarification.

Refer to FIG. 10, which is the first flow chart representing the substrate inspection method of the present invention. Also refer to FIGS. 1-3. As shown in the figures, the substrate inspection method of the present invention comprises the steps as follows:

Step S30: movably clamping the substrate by a plurality of clamping units of the bearing module.

Step S31: receiving the first inspection signal by the control module and accordingly driving the lifting unit of the device main body to move in the first direction, such that the illuminating and image capturing module moves closer to the substrate.

Step S32: controlling the shifting unit by the control module to drive the light emission element to project the first spot-light on the substrate through the opening of the bearing module and controlling the shifting unit to move by the step manner in the second or the third direction to carry bearing module to move.

Step S33: controlling the illuminating and image capturing module by the control module to capture images of a plurality of first regions of the substrate and to generate a plurality of first images.

Preferably, the substrate inspection method of the present invention can further comprise the steps as follows:

Step S34: receiving the plurality of first images by the control module and transforming them to the first full range inspection image by using the default image stitching program.

Step S35: generating the first inspection result message by the control module based on the comparison of the first full range inspection image to the preset first standard image.

Figure 11:
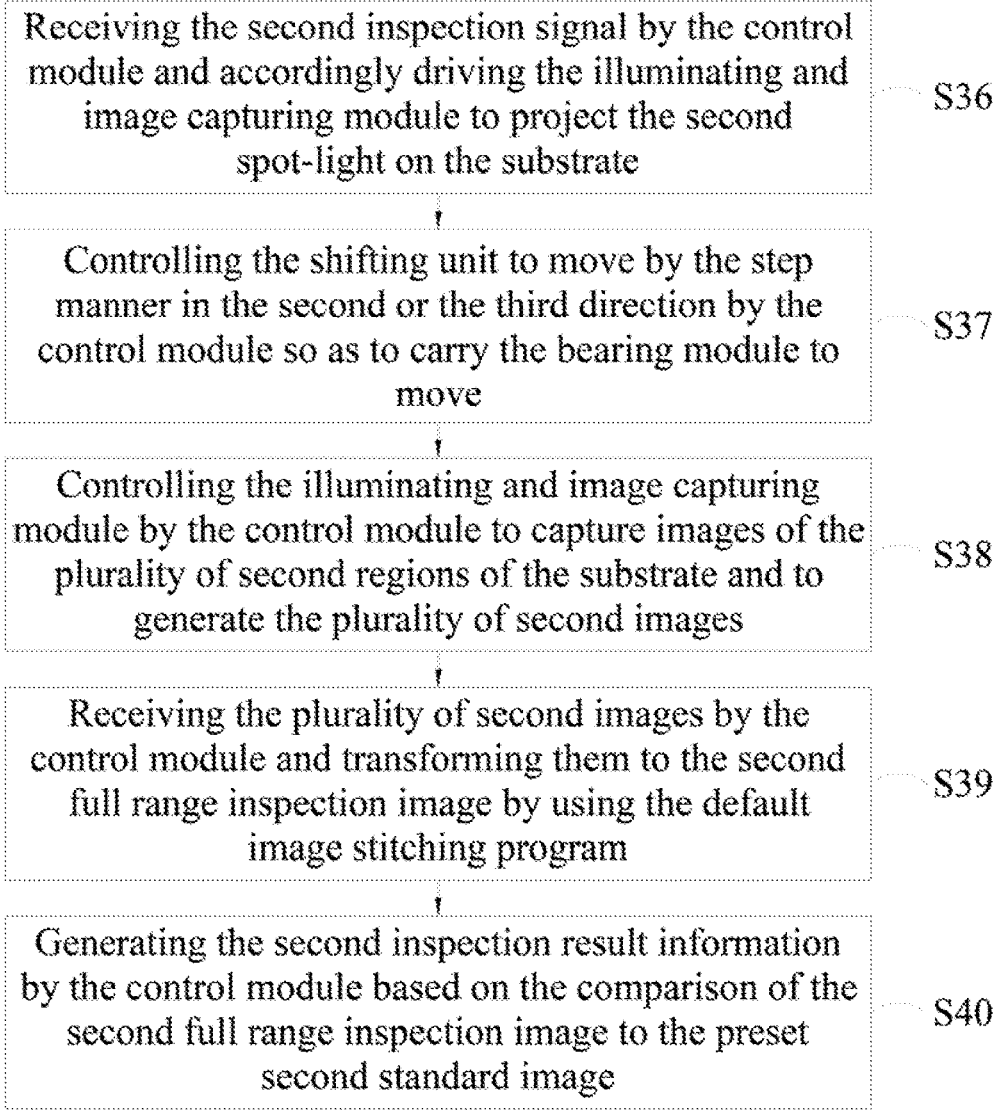
FIG. 11 is the second flow chart representing the substrate inspection method of the present invention.

Refer to FIG. 11, which is the second flow chart representing the substrate inspection method of the present invention, and FIGS. 1-4. As shown in the figures, the substrate inspection method of the present invention can preferably further comprise the steps as follows:

Step S36: receiving the second inspection signal by the control module and accordingly driving the illuminating and image capturing module to project the second spot-light on the substrate.

Step S37: controlling the shifting unit to move by the step manner in the second or the third direction by the control module so as to carry the bearing module to move.

Step S38: controlling the illuminating and image capturing module by the control module to capture images of the plurality of second regions of the substrate and to generate the plurality of second images.

Preferably, the substrate inspection method can further comprise the steps as follows:

Step S39: receiving the plurality of second images by the control module and transforming them to the second full range inspection image by using the default image stitching program.

Step S40: generating the second inspection result message by the control module based on the comparison of the second full range inspection image to the preset second standard image.

Refer to FIG. 12, which is the third flow chart representing the substrate inspection method of the present invention, and FIGS. 1-6. As shown in the figures, the substrate inspection method of the present invention can preferably further comprise the steps as follows:

Step S41: receiving the third inspection signal by the control module and accordingly controlling the illuminating module to move towards the bearing module, such that the condenser unit of the illuminating module moves to the position between the shifting unit and the bearing module and corresponding to the illuminating and image capturing module.

Step S42: controlling the shifting unit to move by the step manner in the second or the third direction by the control module so as to carry the bearing module to sequentially move to the plurality of preset locations and controls the condenser unit to sequentially project the focused light, through the opening, on one of the plurality of apertures of the substrate.

Step S43: controlling the illuminating and image capturing module by the control module to sequentially capture the images of the plurality of apertures and to generate the plurality of aperture images.

Refer to FIG. 13, which is the fourth flow chart representing the substrate inspection method of the present invention, and FIGS. 1-8. As shown in the figures, before the control module receiving the inspection signal in step S31, the substrate inspection method of the present invention can further comprise the steps as follows:

Step S301: controlling the distance measuring module by the control module to project at least one distance measuring light on the substrate based on the measuring signal.

Step S302: receiving at least one distance measuring light reflected by the substrate and generates the distance signal by the distance measuring module.

Preferably, after generating distance signal in step S302 of the substrate inspection method of the present invention can further include the steps as follows:

Step S303: receiving the distance signal by the control module and accordingly controlling the lifting unit to move in the first direction, such that the illuminating and image capturing module is spaced apart from the substrate by a predetermined working distance.

Step S304: controlling the illuminating and image capturing module by the control module to capture an image for each first region of the substrate based on a first inspection signal.

The description above is only for the purpose of illustration but not restriction. Without departing from the spirit of the present application, any equivalent modification or alteration should be considered as falling within the protection scope of the appended claims.

What is claimed is:

1. A substrate inspection device, comprising:
   a device main body, on a surface of which is movably disposed with a shifting unit and above the surface of which is suspended a lifting unit, wherein a light emission element is disposed on a surface of the shifting unit;
   a bearing module, which is suspended above the surface of the shifting unit and has an opening, wherein a plurality of clamping units are movably disposed on a surface on an opposite side from a surface opposing to the shifting unit and can movably clamp a substrate;
   an illuminating and image capturing module, which is disposed on the lifting unit;
   a control module, which is electrically connected to the shifting unit, the lifting unit, and the illuminating and image capturing module, wherein the control module receives a first inspection signal and accordingly drives the lifting unit to move in a first direction, such that the illuminating and image capturing module moves closer to the substrate, and the control module controls the shifting unit to drive the light emission element to project a first spot-light through the opening on the substrate and controls the shifting unit to move by a step manner in a second direction or in a third direction so as to carry the bearing module to move, and the control module controls the illuminating and image capturing module to capture images of a plurality of first regions of the substrate and to generate a plurality of first images; and
   an illuminating module, which is movably disposed on the device main body and is electrically connected to the control module, and a condenser unit is disposed on the illuminating module, wherein the control module receives a third inspection signal and accordingly controls the illuminating module to move towards the bearing module, such that the condenser unit moves to a position between the shifting unit and the bearing module and corresponding to the illuminating and image capturing module, and the control module controls the shifting unit to move by the step manner in the second direction or the third direction so as to carry the bearing module to sequentially move to a plurality of preset locations and controls the condenser unit to sequentially project focused light through the opening on one of a plurality of apertures of the substrate, and the control module controls the illuminating and image capturing module to sequentially capture images of the plurality of apertures and to generate a plurality of aperture images.

2. The substrate inspection device of claim 1, wherein the control module receives the plurality of first images and transforms the plurality of first images to a first full range inspection image by using a default image stitching program, and the control module generates a first inspection result message based on the comparison of the first full range inspection image to a preset first standard image.

3. The substrate inspection device of claim 1, wherein the control module receives a second inspection signal and accordingly drives the illuminating and image capturing module to project a second spot-light on the substrate and controls the shifting unit to move by the step manner in the second direction or the third direction so as to carry the bearing module to move, and the control module controls the illuminating and image capturing module to capture images of a plurality of second regions of the substrate and to generate a plurality of second images.

4. The substrate inspection device of claim 3, wherein the control module receives the plurality of second images and transforms the plurality of second images to a second full range inspection image by using a default image stitching program, and the control module generates a second inspection result message based on the comparison of the second full range inspection image to a preset second standard image.

5. The substrate inspection device of claim 1, further comprising a distance measuring module, which is electrically connected to the control module and is disposed on the lifting unit, wherein the control module controls the distance measuring module to project at least one distance measuring light on the substrate based on a measuring signal, and the distance measuring module receives at least one distance measuring light reflected by the substrate and generates a distance signal.

6. The substrate inspection device of claim 5, wherein the control module receives the distance signal and accordingly controls the lifting unit to move in the first direction, such that the illuminating and image capturing module is spaced apart from the substrate by a predetermined working distance, and the control module controls the illuminating and image capturing module to capture an image for each first region of the substrate based on the first inspection signal.

7. A substrate inspection method, comprising the steps of:
movably clamping a substrate by a plurality of clamping units of a bearing module;
receiving a first inspection signal by a control module and accordingly drives a lifting unit of a device main body to move in a first direction, such that an illuminating and image capturing module moves closer to the substrate;
controlling a shifting unit by the control module to drive a light emission element to project a first spot-light through an opening of the bearing module on the substrate and controlling the shifting unit to move by a step manner in a second direction or in a third direction so as to carry the bearing module to move;
controlling the illuminating and image capturing module by the control module to capture images of a plurality of first regions of the substrate and to generate a plurality of first images;
receiving a third inspection signal by the control module and accordingly controlling an illuminating module to move towards the bearing module, such that a condenser unit of the illuminating module moves to a position between the shifting unit and the bearing module and corresponding to the illuminating and image capturing module;
controlling the shifting unit to move by the step manner in the second direction or in the third direction by the control module so as to carry the bearing module to move sequentially to a plurality of preset locations and controlling the condenser unit to sequentially project a focused light through the opening on one of a plurality of apertures of the substrate; and
controlling the illuminating and image capturing module by the control module to sequentially capture images of the plurality of apertures and to generate a plurality of aperture images.

8. The substrate inspection method of claim 7, further comprising the steps of:
receiving the plurality of first images by the control module and transforming the plurality of first images to a first full range inspection image by using a default image stitching program; and
generating a first inspection result message by the control module based on the comparison of the first full range inspection image to a preset first standard image.

9. The substrate inspection method of claim 7, further comprising the steps of:
receiving a second inspection signal by the control module and accordingly driving the illuminating and image capturing module to project a second spot-light on the substrate;
controlling the shifting unit by the control module to move by the step manner in the second direction or in the third direction so as to carry the bearing module to move; and
controlling the illuminating and image capturing module by the control unit to capture images of a plurality of second regions and to generate a plurality of second images.

10. The substrate inspection method of claim 9, further comprising the steps of:
receiving the plurality of second images by the control module and transforming the plurality of second images to a second full range inspection image by using a default image stitching program; and
generating a second inspection result message by the control module based on the comparison of the second full range inspection image to a preset second standard image.

11. The substrate inspection method of claim 7, before the step of receiving the first inspection signal by the control module, further comprising the steps of:
controlling a distance measuring module by the control module to project at least one distance measuring light on the substrate based on a measuring signal; and the distance measuring module receiving at least one distance measuring light reflected by the substrate and generating a distance signal.

12. The substrate inspection method of claim 11, wherein the step of generating the distance signal further comprises the steps of:

receiving the distance signal by the control module and accordingly controlling the lifting unit to move in the first direction, such that the illuminating and image capturing module is spaced apart from the substrate by a predetermined working distance; and controlling the illuminating and image capturing module by the control module to capture an image for each first region of the substrate based on the first inspection signal.

* * * * *